June 2, 1964

E. T. HEALD 3,135,919

TONE FREQUENCY CONTROL MEANS FOR
KINEMATICALLY FILTERED SYSTEMS

Filed Aug. 26, 1960

INVENTOR.
EARL T. HEALD
BY Moody and Phillion
ATTORNEYS

INVENTOR.
EARL T. HEALD
BY Woody and Phillips
ATTORNEYS

INVENTOR.
EARL T. HEALD
BY Moody and Phillips
ATTORNEYS

United States Patent Office 3,135,919
Patented June 2, 1964

3,135,919
TONE FREQUENCY CONTROL MEANS FOR KINEMATICALLY FILTERED SYSTEMS
Earl T. Heald, Cedar Rapids, Iowa, assignor to Collins Radio Company, Cedar Rapids, Iowa, a corporation of Iowa
Filed Aug. 26, 1960, Ser. No. 52,301
9 Claims. (Cl. 325—320)

This invention relates to frequency control means for a digitally-modulated tone applied to a kinematically-filtered detection system. Kinematically-filtered detection systems use keyed filters in their detection process.

The terms "keyed filter," "keyed resonator" and "kinematic filter" have the same meaning as used herein. Such a device is the subject of U.S. Patent No. 2,825,808 by Melvin L. Doelz and Earl T. Heald.

This invention senses a difference between the center frequency $f_n$ of a received digitally-modulated tone and the tuned frequency $f_0$ of a kinematic resonator. The invention also includes means for varying tone frequency $f_n$ to maintain it in alignment with tuned frequency $f_0$. The digital modulation on the received tone has a constant-phase during synchronous bits of the tone that carry information by either discrete bit amplitudes or discrete bit phases. A keyed resonator has a very high Q (almost infinite Q), and positive feedback is generally used in aid obtaining its high Q. A keyed resonator is gated on and off for each received tone bit, and it averages the effects of noise over each bit period to improve the signal-to-noise ratio of the received signal. Keyed filters also improve the separation of tones in frequency-multiplexed digital communications.

A well-developed use for kinematic resonators is in phase-pulse communication systems. Such systems and their modulators, detectors, bit-synchronizers, etc., have been the subject of numerous prior patents and applications, some of which are: U.S. Patent No. 2,676,245 titled, "Polar Communication System" by Melvin Doelz; U.S. Patent No. 2,833,917 titled, "Locking Oscillator Phase-Pulse Generator" by Dean F. Babcock; patent application Serial No. 716,206, now U.S. Patent No. 2,994,790, titled, "Data Phase Coding System" by Frank Delaney, filed February 19, 1958; patent application Serial No. 626,493, now U.S. Patent No. 2,915,633, titled, "Phase-Pulse Generator" by George Barry, filed December 5, 1956; Patent No. 2,870,431, titled, "Matrix Controlled Phase-Pulse Generator" by Dean F. Babcock filed July 8, 1957; Patent No. 2,905,812, titled, "High Information Capacity Phase-Pulse Communication System" by Melvin L. Doelz and Dean F. Babcock; patent application Serial No. 769,452 filed October 24, 1958, now U.S. Patent No. 3,020,485, titled, "Digital Phase-Pulse Detector" to Frank Secretan; and patent application Serial No. 838,960 filed September 9, 1959, now U.S. Patent No. 3,024,420, titled, "Digital Phase-Pulse Detector" by Donald L. Martin.

Two basic principles applying to kinematic-resonator operation are used by this invention: (1) The phase of a resonator oscillation varies as a function of time from the phase of a received tone causing the oscillation, if the tone frequency is not the same as the tuned frequency of the resonator. The direction of phase deviation depends upon whether the tone is above or below the tuned frequency. (2) Any phase difference existing between different time samplings of the resonator oscillation is dependent upon the frequency error of the incoming tone and the time between the samplings. Hence, a keyed resonator induces a phase error into a received tone as a function of time, for any given difference between the received tone and the tuned frequency of the keyed resonator.

Resonator induced phase error can deteriorate the performance of kinematically-filtered systems. In addition to phase deteriorization, another effect of the frequency error is that it also degenerates the amplitude response of the output of a keyed resonator as a function of time. Therefore, frequency error of an incoming tone deteriorates a kinematic detection operation whether it is used to detect phase or amplitude digital modulation carried by the tone.

It is therefore an object of this invention to provide a system for sensing a frequency difference between an input tone and the tuned frequency of its intended keyed resonator.

It is another object of this invention to provide a frequency stabilization system for a kinematically-filtered detection system which aligns the frequency of a received tone with the detection system with relatively little added circuitry.

It is still another object of this invention to provide a frequency control system for a receiver having kinematic filtering, wherein the same keyed resonators required for the detection system are utilized by the frequency control system. Hence, no additional keyed resonators or expensive filters are needed.

It is a further object of this invention to provide a frequency-control system, which can remove the effects of tone frequency errors caused by such things as frequency instability at the tone transmitter, frequency instability of receiver local oscillators, and Doppler frequency shifts resulting from movement of the transmitting and/or receiving terminals.

The invention can be applied in at least two different ways: (1) By phase-comparing samplings taken at two different times from the *same* resonator, or (2) by phase-comparing samplings taken simultaneously from two identical resonators that begin receiving the tone bits at different times. A phase detector compares the sampled phases; and if they are different, a tone frequency error is signified by the direct-current component output of the phase detector. A direct-voltage dependent upon the frequency error is developed by integration of the phase-detector output, and it is used to control a heterodyning frequency which frequency changes the tone prior to it being applied to the keyed resonator.

In the important situation where phase-pulse modulation is used, the invention includes alternate-gating circuitry and frequency-multiplication means to remove ambiguities caused by the digital phase modulation. The minimum frequency multiplication factor is $2^N$, where N is the number of channels that are phase-pulse modulated upon a given tone.

Further objects, features and advantages of this invention will become apparent to one skilled in the art upon further study of this specification and its accompanying drawings, in which:

FIGURES 4(A)–(N) illustrate wave-forms used in explaining the embodiment of FIGURE 3;
FIGURES 5(A), (B), and (C);
and FIGURES 6(A) and (B) illustrate phase-shifts in different types of phase-pulse modulation arrangements applicable to FIGURE 3; and,
FIGURES 7 and 8 show other embodiments of the invention.

Figure 1A:
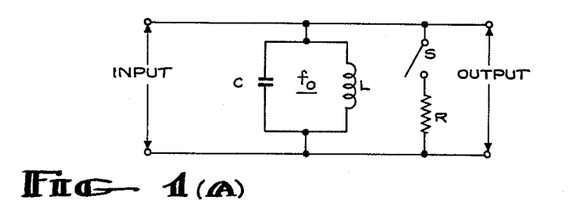
FIGURES 1(A), (B) and (C) are used in explaining the principles of the invention.
Figure 1B:
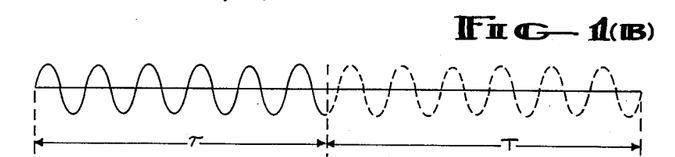
Figure 1C:
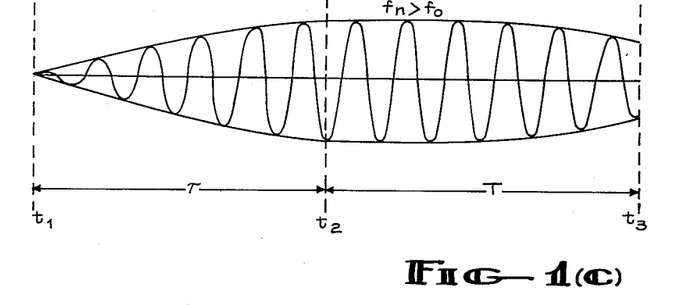

The basic principles involved in this invention can be explained by using FIGURES 1(A), (B) and (C). FIGURE 1(A) illustrates a parallel-resonant circuit having capacitance C and inductance L. It is tuned to frequency $f_0$ and has no resistive loss when a switch S is open; and it corresponds to the extremely high-Q circuit of a keyed resonator. When switch S is closed, any ringing in the resonant circuit is quickly quenched.

If an input wave of constant energy level at frequency $f_0$ is applied to the circuit in FIGURE 1(A), the peaks of the resonator output wave increase as a function of time, as the energy stored in the resonator increases linearly; and the zero crossings of the output wave remain in phase with the input wave.

However, if the input wave is at a frequency $f_n$ different from tuned frequency $f_0$, the output of the lossless resonant circuit does not increase its peaks linearly with time. Instead, the peaks gradually build up to a maximum and then gradually decrease toward zero level in a periodic manner at the difference frequency, $f_n-f_0$.

But most important in regard to this invention, when a difference frequency exists, the phase of the resonator output wave (as determined by its zero crossing) deviates more and more from the phase of the input wave with the passage of time. Furthermore, the phase of the output wave changes with time in a leading or lagging direction according to whether the frequency of the input wave is above or below the resonant frequency.

FIGURE 1(B) illustrates an input wave at frequency $f_n$ provided for a period $\tau$ to the input of the resonant circuit in FIGURE 1(A). It is assumed that the wave frequency $f_n$ of FIGURE 1(B) is slightly above the tuned frequency $f_0$ of the resonator. The dashed wave following period $\tau$ for time T between $t_2$ to $t_3$ is merely an extension of the wave for phase illustration purposes.

FIGURE 1(C) illustrates the corresponding resonator output, starting from a quenched condition, as the input wave of FIGURE 1(B) is applied. The resonator output begins to build up in amplitude and in phase with the incoming frequency $f_n$. However, as time expires during the application of the input wave, the output wave continues to build up in amplitude but its phase gradually changes in a lagging manner from the phase of the input wave, due to the internal properties of the resonator reacting with the incoming wave. The longer the input wave is applied, the greater becomes the phase difference between the resonator output and input.

It is assumed that at time $t_2$, the input wave terminates; and therefore it was applied to the resonator for time $\tau$. However, after time $\tau$, the resonator continues to ring due to its stored energy and losslessness. But it has a tendency to ring at its tuned frequency $f_0$ rather than at frequency $f_n$ of the input wave. During the ringing, a frequency transition occurs toward tuned frequency $f_0$, which continues the phase change in a lagging direction, caused by the increasing wavelength needed to reach $f_0$ from higher frequency $f_n$. The phase transition continues until a time $t_3$ at which the ringing is presumed to be ended by quenching the resonator by closing switch S momentarily.

It therefore becomes apparent that a phase shift E of the resonator output varies as a function of time $t$ and as a function of the difference frequency $(f_n-f_0)$. The total phase-shift E may be approximated by the following expression:

$$E=G360°(f_n-f_0)t \quad (1)$$

where G is a proportionate constant.

Therefore, if at different times two samplings are made of the wave in FIGURE 1(C), such as at fixed times $t_2$ and $t_3$, and they are phase compared, the amount and direction of phase deviation of the latter sampling from the former sampling is proportional to the difference between the input frequency $f_n$ and the resonant frequency $f_0$.

Thus, from the Expression 1, if input frequency $f_n$ equals resonant frequency $f_0$, there will be no phase error E.

But if $f_n$ is greater than $f_0$, a lagging phase-error increases with time, resulting in a positive sign for E in Expression 1.

On the other hand, if $f_n$ is less than $f_0$, a leading phase-error increases with time, resulting in a negative sign for E in Expression 1.

Figure 2:
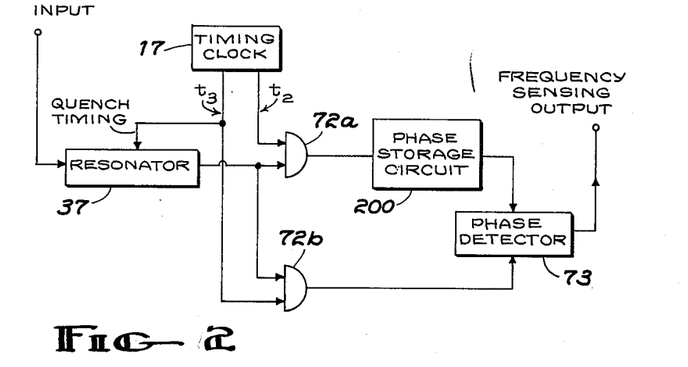
FIGURE 2 illustrates an embodiment of the invention.

FIGURE 2 shows a system for obtaining and phase comparing two time samplings from a single resonator 37. Time interleaved pulses from a timing clock source 17 occur at sampling $t_2$ and $t_3$ and have sufficient duration to be assured of sampling a zero-crossing of the wave. A pair of "and" gates 72a and b receive the resonator output and are respectively enabled by outputs of clock 17 at times $t_2$ and $t_3$.

The first phase sampling from gate 72a at time $t_1$ is stored in a phase storage circuit 200, which may be a circuit such as described and claimed in U.S. patent application Serial No. 732,900 filed May 5, 1958 by Frank Secretan titled, "Digital Phase Storage Circuit." Circuit 200 oscillates at frequency $f_0$, and it stores a sampled phase by having its zero crossings reset instantly to a zero crossing of the sampling wave about time $t_2$.

A phase detector 73 has inputs receiving the outputs of phase storage circuit 200 and of gate 72b. It provides a pulsed direct-current output component during the sampling around time $t_3$. The direct-current amplitude is dependent upon the difference frequency $(f_n-f_0)$, and its polarity is dependent upon whether $f_n$ is greater or less than $f_0$.

The embodiments which follow involve two identical high-Q resonators, equally tuned. An input tone is alternately switched between the resonators, so that it reaches only one resonator at any one time. Each resonator is permitted to ring for the following period during which it receives no input tone. Hence, the resonators begin their respective operations at different times. Simultaneous samplings of both resonators therefore involve different operating times for each, since time $t$ in Expression 1 is measured from the time an input wave is first applied to a resonator. Accordingly, a given frequency error causes different phase-shifts to exist in the two resonators at a simultaneous sampling. A leading or lagging phase difference determines that the input frequency is above or below the tuned frequency.

Figure 3:
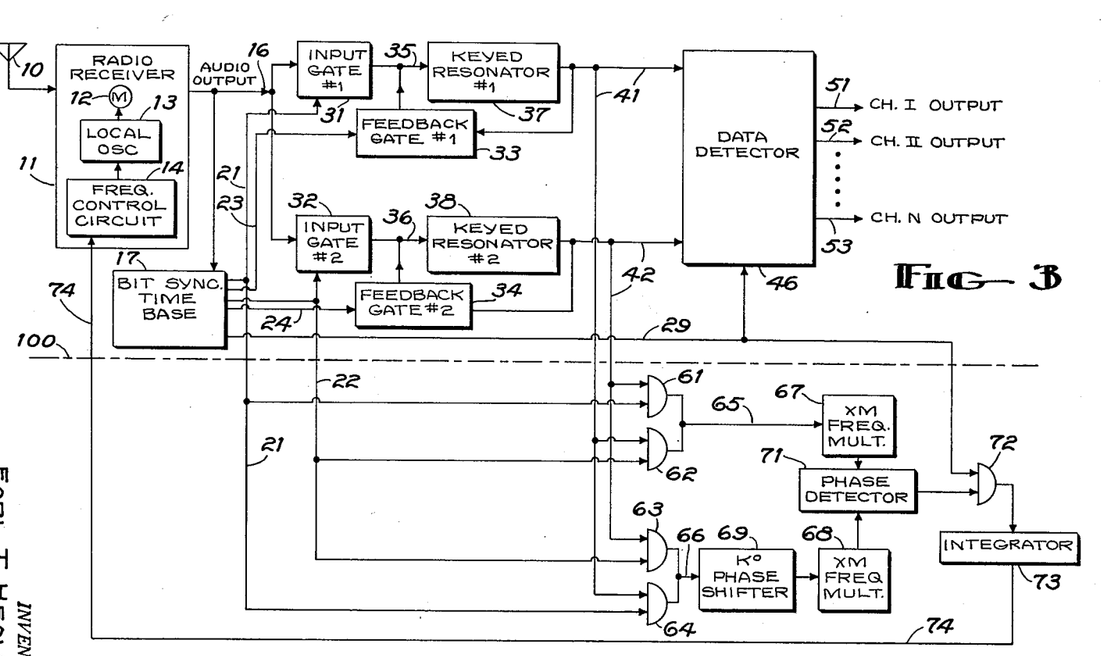
FIGURE 3 shows another embodiment of the invention.
Figure 4:
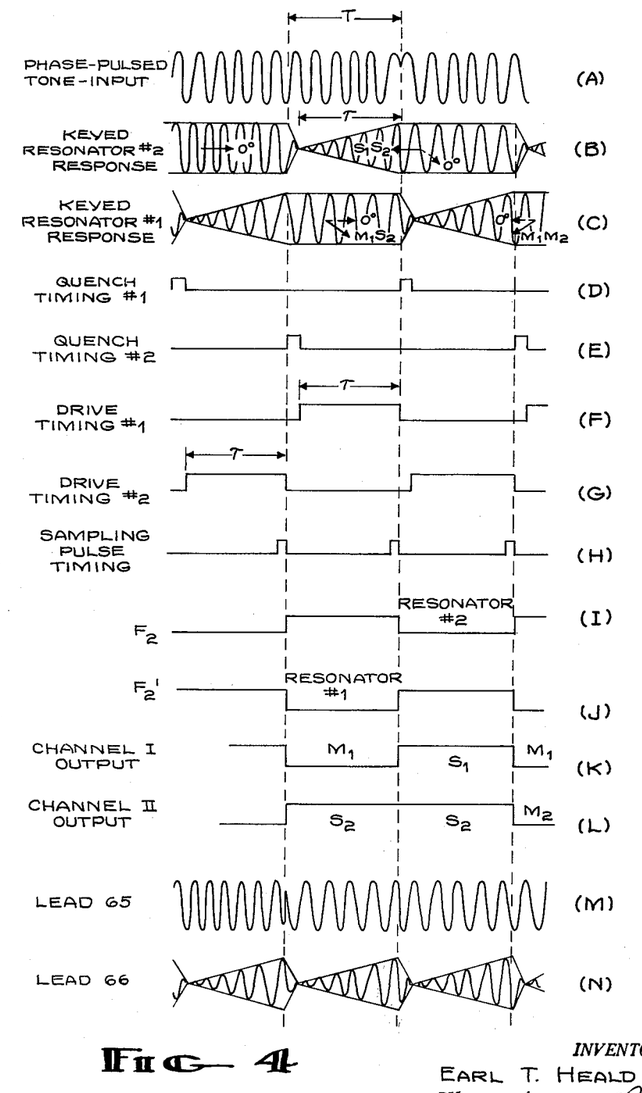

FIGURE 3 illustrates a system which utilizes a pair of keyed resonators 37 and 38 in this manner. Resonators 37 and 38 receive an input tone that is switched between their inputs during alternate periods $\tau$, and they ring for following alternate periods T until quickly terminated by respective quenchings as shown in FIGURES 4(B) and (C). FIGURES 4(F) and (G) illustrate the alternate drive times $\tau$; and FIGURES 4(D) and (E) illustrate the quench timings.

FIGURE 3 is divided by a broken line 100. Its portions above line 100 are not considered by themselves unique to this application, since they have been treated in several of the patents and applications cited previously herein. Nevertheless, they are required to operate in combination with the added circuitry below line 100 to provide the inventive concept, and they are shown and briefly described in order to enable a complete understanding of embodiments of this invention.

Figures 5A, 5B:
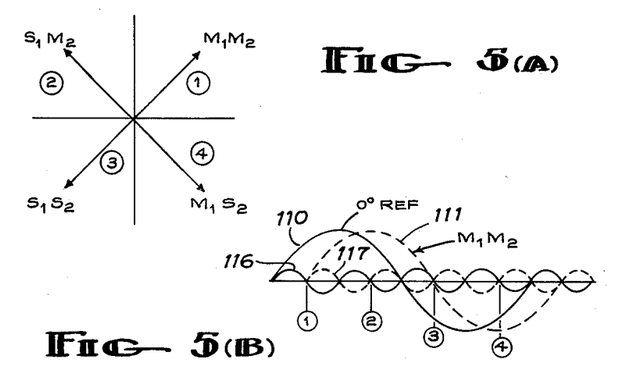
Figures 6A, 6B:
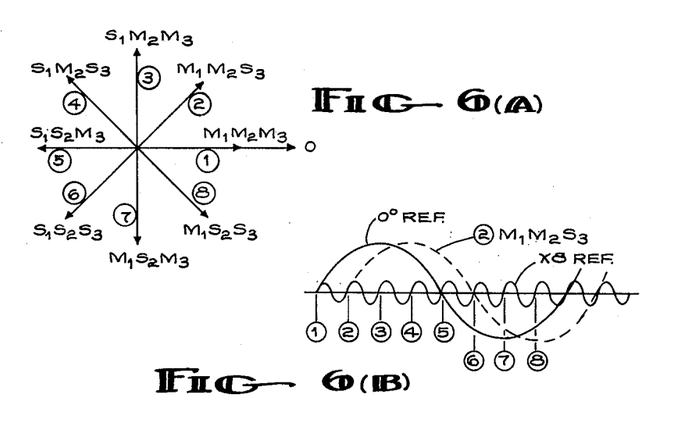

Since a received tone may have its synchronous bit periods modulated with either amplitude or phase, FIGURE 3 applies in either case. However, for illustrative and explanatory purposes that immediately follow, FIGURE 3 presumes the use of an input signal having phase-pulse modulation, which is considered the most efficient type for kinematic-filtered systems. With phase-pulse modulation, one or plural channels can be modulated simultaneously onto a single carrier tone. When N channels are modulated onto a single tone, a phase-shift code is chosen with at least $2^N$ number of phase shifts; and each phase-shift represents N bits of information, one bit per channel per phase-shift. FIGURE 5(A) shows one of several arrangements of four phase-shifts for encoding two binary channels of information. FIGURE 6(A) illustrates one of several arrangements for modulating three binary channels simultaneously onto a single tone.

For the two channel arrangement in FIGURE 5(A), there are four phase-shifts ①, ②, ③, and ④ available; and they are respectively assigned the four data combinations $M_1M_2$, $M_1S_2$, $S_1S_2$, and $S_1M_2$. Thus, in FIGURE 5(A) a coding is provided in which $M_1$ and $S_1$ represent a respective mark and space of channel I, and $M_2$ and $S_2$ represent similarly a mark and space for channel II. The order of assignment of information bits of the respective channels to the phase-shifts is arbitrary in any given transmitting-receiving system, but must be consistent within a system.

FIGURE 4(A) illustrates an example of a received phase-pulse modulated signal. Note that a phase shift of one of the discrete amounts in FIGURE 5(A) occurs between bits of the received signal.

The signal is received at an antenna 10, that is connected to an input of a radio receiver 11. The signal may include only one modulated tone or a group of tones that are preferably frequency spaced by $\Delta f = H/\tau$, where H is an integer other than 0, and $\tau$ is the periodic tone input time for a resonator, called its driving time.

Receiver 10 can be conventional, and it includes one or more heterodyning stages, of which a frequency mixer 12 is exemplary. A local heterodyning frequency is provided to mixer 12 from a local oscillator 13, and it is frequency controlled by a frequency control circuit 14. Circuit 14 may be a reactance tube circuit, a saturable reactor, a variable-capacitance diode, etc., each of which is a circuit well-known in the art of frequency controlling an oscillator with a varying direct-current, that is provided herein from a lead 74.

Keyed resonators 37 and 38 have succeeding bits of the received signal alternately switched to their inputs by gates 31 and 32 that connect to receiver output 16. Gates 31 and 32 act like a single-pole double-throw switch.

Alternate-switching drive-timing inputs to gates 31 and 32 are provided from leads 21 and 22, that are respective outputs of a time base 17. Bit-synchronous time-base 17 may be constructed in the manner described and claimed in U.S. Patent No. 2,914,674, titled "Phase-Pulse Receiver Synchronizing Means" by George H. Barry.

In a similar manner, the keyed resonators are alternately quenched immediately before each drive period $\tau$ by quench timing from leads 23 and 24 of time base 17. Leads 23 and 24 connect to feedback gates 33 and 34 respectively, which are normally disabled. But when either gate 33 or 34 is enabled momentarily by a quench pulse, it passes amplified negative feedback which quickly quenches any oscillation within the resonator.

The drive and quench timing signals are all synchronized with the phase-shifts which occur between bits of the received signal, as is evident in FIGURES 4(A)–(N).

The keyed resonators, when tuned to the input tone, average the phase and amplitude of an incoming tone over each drive period $\tau$ to average the effects of noise upon the output phase and amplitude of the resonator. This causes an effective improvement in output signal-to-noise ratio over conventional digital data communication systems. After each drive period $\tau$, the input ceases and the resonator is permitted to ring with its averaged phase and amplitude. The ringing following an input period represents phase-storage during the next bit period. The averaged phase or amplitude is sampled at the end of each drive period $\tau$, and is compared with the ringing reference phase of the other resonator. The ringing is terminated when a respective quench pulse is received. Since the keyed filters are enabled alternately, they have output responses like those shown in FIGURES 4(B) and (C).

A data detector 46 receives the outputs of resonators 37 and 38, and includes means for sampling and for phase comparing the resonator outputs to detect the received information. Detector 46 receives sampling timing from lead 29 connected to time base 17 to sample the resonator outputs at the end of each drive period $\tau$. A plurality of detector outputs 51, 52 . . . 53 provide respective channel outputs, according to the number of channels modulated onto the single tone filtered by resonators 37 and 38.

In this case, detector 46 can be constructed as described and claimed in U.S. patent application Serial No. 769,452 filed October 24, 1958 titled, "Digital Phase-Pulse Detector" or U.S. patent application Serial No. 838,960, filed September 9, 1959, titled, "Digital Phase-Pulse Detector" or as found in other patents or applications cited previously herein. Two pairs of gates 61—62 and 63—64 respectively receive the outputs of resonators 37 and 38. These gates have the purpose of eliminating a first ambiguity that could result from the alternate gating of resonators 37 and 38. This first ambiguity is caused by the alternating phase reference, which reverses the sense of the phase modulations. In effect, gates 61–64 act like a double-throw double-pole switch. With the gating, the ringing zero-reference phases are always provided on lead 65, and the phases of newly received bits are always provided on lead 66. FIGURE 4(M) illustrates the segregated stored phases on lead 65 and FIGURE 4(N) illustrates the segregated newer bit phases on lead 66 to eliminate alternation of the zero-reference phase.

To do this, gates 61 and 63 have inputs connected to lead 42 to receive the output of resonator 38; and gates 62 and 64 have inputs connected to lead 41 to receive the output of resonator 37.

Each pair of gates is alternately enabled by drive-timing outputs 21 and 22 from time base 17. Gates 61—62 receive the resonator drive timing in reverse order from the drive timing to the resonators to which outputs the gates are connected, so that only new bits are selected. The drive timing order to gates 63–64 is reversed so that only storage bits are selected. Thus, gates 61 and 64 have inputs connected to lead 21, and gates 62 and 63 have inputs connected to lead 22.

The phase-shift modulation itself also causes a second ambiguity, which is eliminated by a pair of frequency multipliers 67 and 68.

The phase-shift ambiguity eliminated by the multipliers cannot eliminate the reference-alternation ambiguity. The multipliers cannot correct the alternation in direction of phase-error, which is alternately reversed by phase-reference alternation.

An input of multiplier 67 is connected to lead 65 to receive the stored reference phases. Multiplier 68 has an input connected through a phase shifter 69 to lead 66 to receive the new-bit phases. A phase detector 71 has inputs respectively receiving the outputs of multipliers 67 and 68. The multiplication factor M equals $2^N$ for each of frequency multipliers 67 and 68, where N is the number of channels carried by the filter selected tone.

Phase shifter 69 is provided to obtain a direct-current null condition at the output of phase detector 71 when tone frequency $f_n$ equals tuned frequency $f_0$.

Figure 5C:
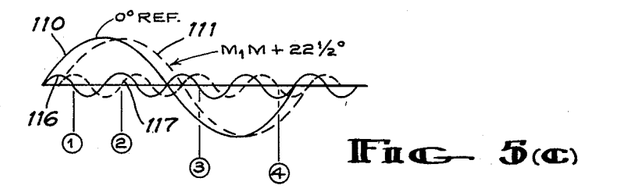

The effects of frequency multiplication and phase shifting can be explained using FIGURES 5(B) and (C). FIGURE 5(B) illustrates the $M_1M_2$ phase shift of FIGURE 5(A). The 0° reference phase of a stored bit is illustrated by wave 110 in FIGURE 5(B). The next bit $M_1M_2$ has its phase represented by wave 111, which lags by 45° and corresponds to phase shift ① in FIGURE 5(A). The other available phase shifts ②, ③, and ④ would instead start wave 111 at respectively marked points in FIGURE 5(B). A frequency multiplication by 4 of wave 110 provides wave 116. Likewise, a frequency multiplication of 4 for wave 111 provides wave 117. It can be seen from multiplied waves 116 and 117 that their relative phase is unchanged regardless of which phase ①, ②, ③, or ④ is provided between waves 110 and 111.

However, it will be noted that multiplied waves 116 and 117 are 180° phase-wise. However, many conventional phase detectors provide a nulled output when their inputs are 90° apart. To accommodate such phase shifters, item 69 is provided in FIGURE 3 to phase shift wave 117 by 90° to obtain the direct-current null for phase detector 71, as long as the perfect phase relationship of FIGURE 5(B) is obtained. Since phase-shifter 69 operates upon wave 111 before it is multiplied, it must provide a phase shift of 22½° for a multiplication by 4 to yield a phase shift of 90°. FIGURE 5(C) illustrates the relative phases of the waves when phase shifter 69 causes a phase shift of 90° to wave 117. The phase shift K° of phase shifter 69 is determined by $K° = 360°/2^{N+2}$. A 90° phase shifter can instead be provided on the output side of either multiplier 67 or 68, and it provides a fixed phase shift regardless of the multiplication factor. This is done in later embodiments herein.

Phase detector 71 has a short time-constant at its output that is a fraction of a sampling period.

In FIGURE 3, a sampling gate 72 has an input connected to the output of phase detector 71. Another input of gate 72 is connected to lead 29 to receive sampling pulses from time base 17, which occur at the end of each input and ringing period for resonators 37 and 38. The sampling pulses received by gate 72 are illustrated in FIGURE 4(H). Hence any direct-current output from phase detector 71 will provide short-duration pulses at the output of gate 72, with the polarity and amplitude of the direct-current output at the time of each sampling pulse.

The ideal phase-shifts of FIGURE 5(A) are presumed to be received by resonators 37 and 38. Nevertheless, if the received tone frequency $f_n$ is different from resonator tuned frequency $f_0$, a deterioration is caused from the ideal phases in FIGURE 5(A) in the manner explained for Expression 1 above. Thus, at the end of drive period $\tau$, the phase shift will be:

$$E_\tau = 360° G(f_n - f_0)\tau \quad (2)$$

And at the end of the ringing period which is $\tau + T$ from the start of the drive period, the total phase shift will be:

$$E_{(\tau+T)} = 360° G(f_n - f_0)(\tau + T) \quad (3)$$

Since phase detector 71 operates on simultaneous samplings, wherein one is at time $\tau$ from the beginning of its drive period, and the other is at time $(\tau + T)$ from the beginning of its drive period, a comparative phase error $E_R$ is sensed by the phase-detector output as follows:

$$E_R = 360° G(f_n - f_0)(\tau + T) - 360° G(f_n - f_0)\tau$$
$$= 360° G(f_n - f_0)T \quad (4)$$

Thus, it is the relative phase change over the ringing periods that are sensed by phase detector 71 in FIGURE 3, and the amplitude of its output is proportional to $E_R$ of Expression 4 for small frequency errors.

Increasing the number N of channels per tone has the effect of decreasing the unambiguous frequency pull-in range for the system; but on the other hand, it increases the sensitivity of phase-detector operation by the multiplication factor M. Thus, the system will permit a phase error of up to ±2K° without ambiguity. Consequently, the maximum frequency error which can be sensed by the system without ambiguity is given by the expression:

$$|f_n - f_0|_{MAX} = \frac{1K°}{360°TG} = \frac{1}{GT2^{(N+1)}} \quad (5)$$

An integrator 73 smooths the peaks of the sampled pulses. It can be a resistance-capacitance low-pass filter with a time-constant that is long compared to period T. It provides a direct-current output having a polarity that corresponds to whether frequency $f_n$ is above or below frequency $f_0$. The direct-current magnitude increases with frequency error up to $1/GT2^{(N+2)}$. The direct-current output of integrator 73 is provided on lead 74 to frequency-control circuit 14 so that the frequency oscillator 13 is adjusted accordingly to maintain the tone frequency at frequency $f_0$.

FIGURE 6(A) shows a phase-shift arrangement for encoding three channels on a single tone. It can likewise be detected and frequency controlled by the system of FIGURE 3, except that M will be 8 and K will be 11¼°. FIGURE 6(B) shows corresponding phase relationships of its wave forms.

Figure 7:
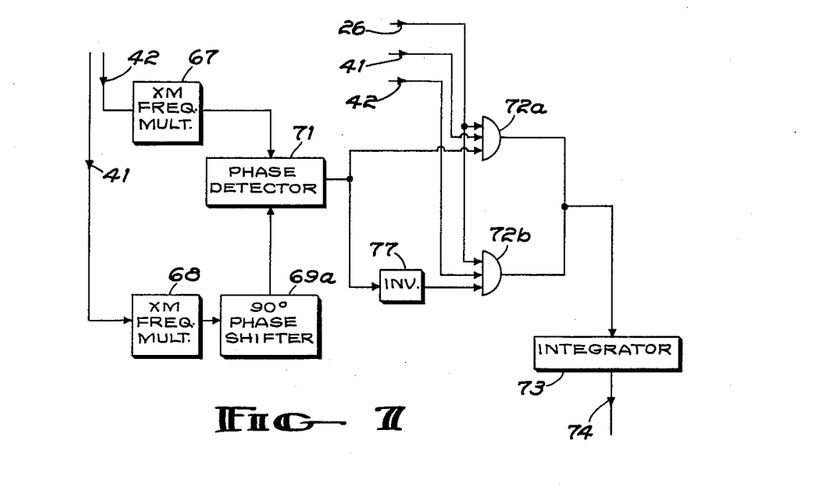

The phase-reference ambiguity was eliminated by gates 61–64 in FIGURE 3 to prevent the polarity of the phase-detector output from varying with the modulation. The ambiguity can be eliminated in other ways and FIGURE 7 illustrates another way. In FIGURE 7, the inputs to frequency multipliers 67 and 68 are directly connected to resonator output leads 42 and 41, respectively. Thus, a modulation ambiguity occurs at the output of phase detector 71 in FIGURE 7 when there is a frequency error. The modulation ambiguity is removed in FIGURE 7 by a pair of "and" gates 72a and b. Both "and" gates are presumed to be of the same type, with three inputs. One input receives the sampling pulses from lead 26. Another input receives an output from phase detector 71, although gate 72b has its input connected through an inverter 77. The alternate drive timings of the resonators are provided on leads 41 and 42 also as inputs to gates 72a and b to cause removal of the ambiguity. Accordingly, gate 72a only is enabled to pass either D.C. polarity when resonator 37 acts as the phase memory, and gates 72b only is enabled to pass either D.C. polarity when resonator 38 acts as the phase memory.

Integrator circuit 73 in FIGURE 7 has an input connected in parallel to the outputs of gates 72a and b. The output of integrator 73 is provided to lead 74 as feedback in the manner shown in FIGURE 1.

When bits of the received tone are modulated by discrete amplitudes and all have the same transmitted phase, the ambiguities caused by phase-shift modulation are not obtained. Accordingly, the ambiguity-removing gates and frequency multipliers of FIGURES 3 and 7 are not needed.

Figure 8:
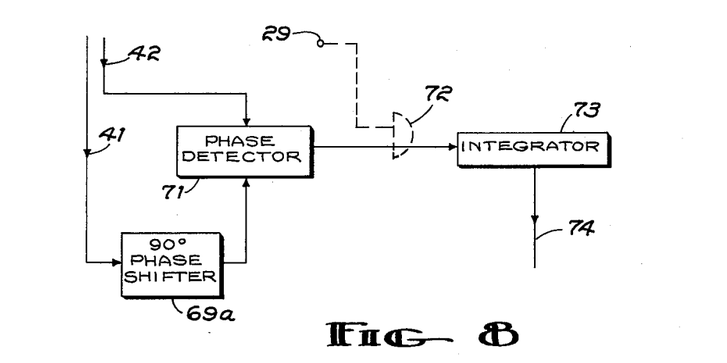

FIGURE 8 shows a system for operating with amplitude-modulated pulses. Thus, resonator output leads 41 and 42 are connected to inputs of phase detector 71, although one input is received through a 90° phase shifter 69(a). The output of phase detector 71 is directly connected to integrator 73 without sampling. This is satisfactory where the input signal-to-noise ratio is high, and it can likewise be done in FIGURES 3 and 7. However, the addition of sampling gate 72 improves the performance of the system when the signal-to-noise ratio is low, because the sampled parts of the phase-detector output are the most reliable parts for indicating frequency error.

It is obvious from the above description that this invention applies to any phase-pulse detector system including those having only a single keyed filter with other types of phase-storage circuits.

Although this invention has been described with respect to particular embodiments thereof, it is not to be so limited, as changes and modifications may be made therein which are within the spirit and scope of the invention as defined by the appended claims.

I claim:

1. Frequency control means for controlling the frequency of a heterodyned input signal to a digital phase pulse receiver constructed to receive N channels of information, said receiver comprising frequency heterodyning means for heterodyning said input signal, at least one resonator including in said receiver and responsive to the output signal of said frequency heterodyning means, storage means for storing the phase of respective prior reference bits of said input signal, means for multiplying the frequency of the output signal of said resonator and the frequency of the stored prior reference bit to produce resultant signals which have the same frequency and the same phase relationship for all channels of information, phase comparing means for comparing the phase of said resultant signals to produce a control signal having a characteristic which is indicative of the relative phases of said resultant signals and, consequently, of the output signal of the resonator and the stored prior reference bit signal, and control means responsive to said control signal to control the frequency of said heterodyning means.

2. Frequency control means for controlling the frequency of a heterodyned input signal to a digital phase pulse receiver constructed to receive N channels of information, said receiver comprising frequency heterodyning means for heterodyning said input signal, at least one resonator included in said receiver and responsive to the output signal of said frequency heterodyning means, means for storing the phase of respective prior reference bits of said input signal, means for phase shifting and multiplying the frequency of the output signal of said resonator and the frequency of the stored prior reference bit to produce resultant signals which have the same frequency and the same phase relationship for all N channels of information, phase comparing means for comparing the phase of said resultant signals to produce a control signal having a characteristic which is indicative of the relative phases of said resultant signals and, consequently, of the output signal of the resonator and the stored prior reference bit signal, and control means responsive to said control signal to control the frequency of said heterodyning means.

3. Frequency control means in accordance with claim 2 comprising sampling gating means connected between an input of said control means and the output of said phase comparing means, and further comprising timing means constructed to produce sampling signals which are synchronous with terminal portions of bits of said input signal, and means for supplying said sampling signals to an input of said sampling gating means.

4. Frequency control means for controlling the frequency of a heterodyned input signal to a digital phase pulse receiver constructed to receive N channels of information, said receiver comprising frequency heterodyning means for heterodyning said input signal, at least one resonator included in said system and constructed to be responsive to the output signal of said frequency heterodyning means, means for storing the phase of respective prior reference bits of said input signal, means for multiplying by a factor $2^N$ the frequency of the output signal of said resonator and the stored prior reference bit to produce resultant signals having the same frequency, phase comparing means for comparing the phase of the frequency multiplied output signal of said resonator and the phase of the frequency multiplied stored prior reference bit to produce an indicating signal which is indicative of the relative phases of the applied signals, phase shifting means for producing a phase shift between the signals derived from said resonator and said storing means to produce the same phase relationship between the multiplied signals for all received channels, control means responsive to said indicating signal to control the frequency of said heterodyning means.

5. Frequency control means in accordance with claim 4 comprising sampling gating means connected between an input of said control means and the output of said phase comparing means, and further comprising timing means constructed to produce sampling signals which are synchronous with terminal portions of bits of said input signal, and means for supplying said sampling signals to an input of said sampling gating means.

6. In a kinematic filtering system constructed to receive phase pulse modulated signals having N channels of information and including a pair of kinematic resonators and means for heterodyning the input signal which consists of a carrier signal modulated by the phase pulse modulated signals, frequency control means comprising timing source means constructed to generate alternate driving signals, means for supplying said alternate driving signals to said resonators to alternately gate said resonators into resonance, a pair of frequency multipliers having a multiplication factor of $2^N$, phase shifting means for producing a phase shift between the signals derived from said resonators to produce the same phase relationship between the multiplied signals for all N channels, individual "and" gating means connecting the output terminals of each of said pair of kinematic resonators to individual ones of said pair of frequency multipliers, other input terminals of said "and" gating means being connected to said timing source means to receive said alternate driving signal outputs, said other input terminals of said "and" gating means being connected in a matrix relationship with the connections of the outputs of said kinematic resonators to said "and" gating circuits, phase detector means constructed to respond to the phase relationship between the output signals of said two frequency multipliers to produce an output signal which is indicative of said phase relationship, control means responsive to the output signal of said phase detector means to control the frequency of the output signal of the heterodyning means.

7. A kinematic filtering system in accordance with claim 6, comprising sampling gating means connected between the input of said control means and an output of said phase detector means, said timing source means constructed to produce sampling signal pulses synchronized with terminal portions of the bits of said input signal, and means for supplying said sampling timing output to an input of said sampling gating means.

8. A kinematic filtering system in accordance with claim 6 in which N is equal to 2 and in which said phase shifting means is constructed to produce a 90° phase shift in the output signal of one of said frequency multipliers.

9. A kinematic filtering system in accordance with claim 6 in which N is equal to 2 and in which said phase shifting means is constructed to produce a 90° phase shift in the output signal of one of said frequency multipliers.

References Cited in the file of this patent

UNITED STATES PATENTS

| | | |
|---|---|---|
| 2,513,731 | Loughlin | July 4, 1950 |
| 2,614,221 | Moll | Oct. 14, 1952 |
| 2,695,358 | Bush | Nov. 23, 1954 |
| 2,836,712 | Crosby | May 27, 1958 |
| 2,914,674 | Barry | Nov. 24, 1959 |
| 2,959,742 | Felch et al. | Nov. 8, 1960 |

UNITED STATES PATENT OFFICE
CERTIFICATE OF CORRECTION

Patent No. 3,135,919                          June 2, 1964

Earl T. Heald

It is hereby certified that error appears in the above numbered patent requiring correction and that the said Letters Patent should read as corrected below.

Column 8, line 73, for "including" read -- included --.

Signed and sealed this 13th day of October 1964.

(SEAL)
Attest:

ERNEST W. SWIDER                          EDWARD J. BRENNER
Attesting Officer                             Commissioner of Patents